UNITED STATES PATENT OFFICE.

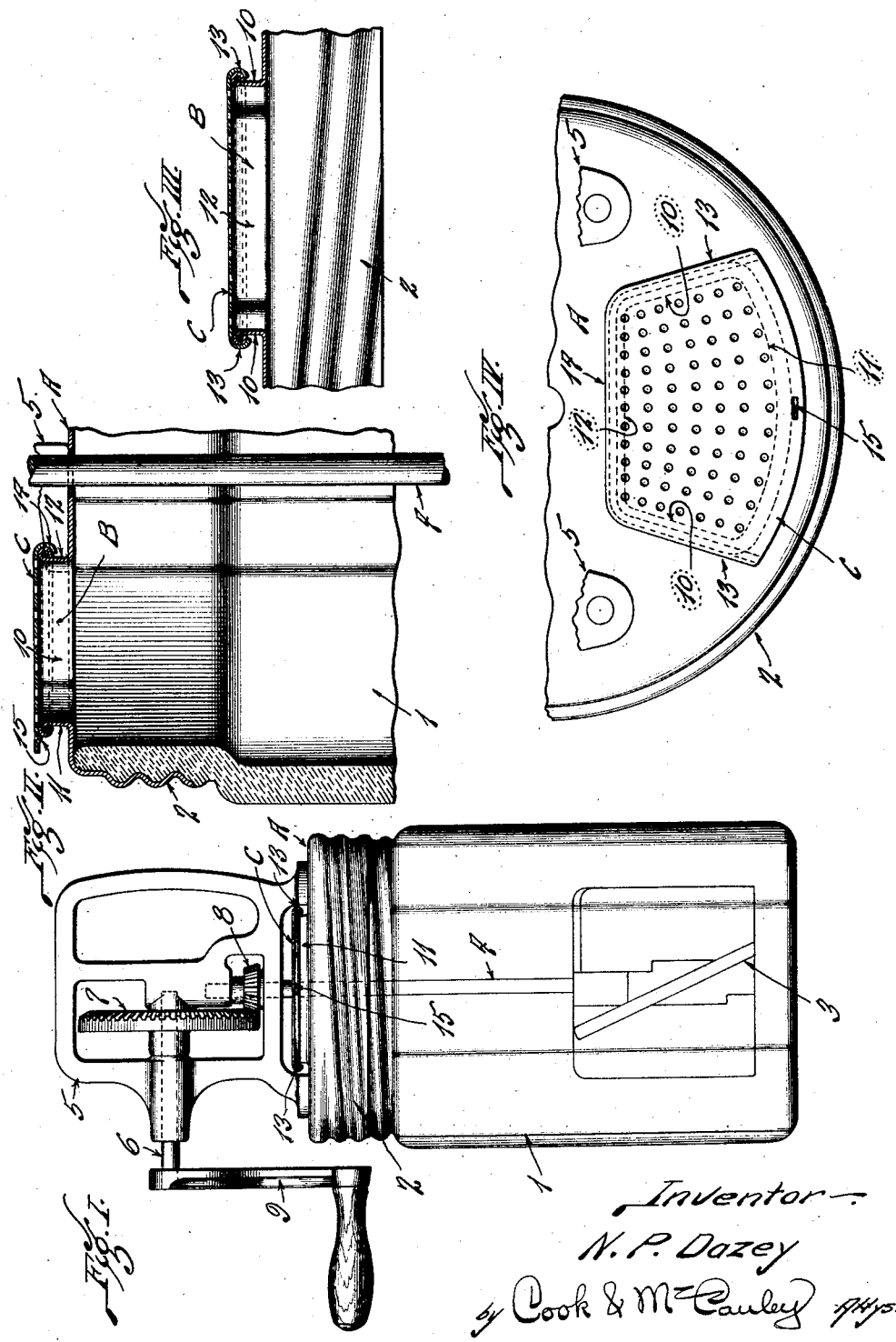

NATHAN P. DAZEY, OF ST. LOUIS, MISSOURI, ASSIGNOR TO DAZEY CHURN AND MANUFACTURING COMPANY, OF ST. LOUIS, MISSOURI, A CORPORATION OF MISSOURI.

CHURN.

1,406,619.   Specification of Letters Patent.   Patented Feb. 14, 1922.

Application filed February 2, 1921. Serial No. 441,936.

*To all whom it may concern:*

Be it known that I, NATHAN P. DAZEY, a citizen of the United States of America, and a resident of the city of St. Louis and State of Missouri, have invented certain new and useful Improvements in Churns, of which the following is a full, clear, and exact description, reference being had to the accompanying drawings, forming a part of this specification.

This invention relates to improvements in churns, the object being to provide a churn particularly of the small capacity type for household use in which the highest quality of butter can be made and very easily and quickly washed without removing the dasher from the churn.

To fully appreciate the merits of this invention, certain conditions in butter making should be noted. The desirable and most scientific method of making butter consists in churning the cream until the butter is in the form of free individual granules, preferably considerably smaller than grains of rice then immediately stopping the churning operation to avoid mashing the granules into each other for this would cause the granules to adhere to each other and particles of buttermilk would be trapped in the mass of butter. It is likewise important to thoroughly wash each individual granule, so as to completely remove the buttermilk. Obviously, these highly important results cannot be accomplished if the butter granules are mashed into each other by the removal and replacing of the dasher.

The churn herein disclosed is adapted to make the butter and thereafter completely wash each individual butter granule, without removing the dasher at any stage of the several successive operations.

Prior to this invention, upon the completion of a churning operation it has been customary to remove the dasher and closure from a churn, so as to permit the removal of the buttermilk therefrom, and to do this a person usually places a strainer cloth over the open top of the churn to prevent the escape of the butter with the buttermilk. After this has been done, water is usually poured into the churn receptacle and the dasher is then replaced in the mass of butter and slowly operated for the purpose of washing the butter. Thereafter, the water is poured from the receptacle while the butter is retained therein by again holding a strainer cloth over the top of the receptacle, thus separating the water from the butter.

In the use of an ordinary churn with a rotary dasher, it is thus necessary to remove and replace the dasher for the purpose of removing the buttermilk and introducing the water for the butter-washing operation. All of this requires a certain amount of time and labor, and the operation of removing and replacing the dasher will impair the quality of the butter, by mashing the granules of butter together, thus trapping some of the buttermilk in the mass of butter so that it cannot be removed by the ordinary washing operation. This is especially true of churns having rotary dashers which are not designed for vertical movement in the butter.

According to the present invention, the dasher and its operating mechanism may be secured to the closure for the churn receptacle, and it is not necessary to remove either the closure or the dasher for the purpose of washing the butter. The main closure of the receptacle is provided with an aperture or opening for the discharge of buttermilk and for the admission of water to be used in washing the butter. Said aperture also permits a view of the churning action and progress of butter formation which cannot be observed when the wall of the receptacle is opaque, and also cannot be satisfactorily observed even when the wall of the receptacle is transparent owing to the same becoming cloudy by the cream splashing upon the sides of the receptacle. Said aperture further provides for the introduction of a thermometer for testing the temperature which is very important in the making of butter. Said aperture in the main closure is normally closed by a removable strainer which confines the butter in the receptacle while the buttermilk is being poured therefrom, and after this has been done the strainer is removed to permit the introduction of water through the opening in the main closure. After the washing operation has been completed, the water is discharged through the strainer which prevents the escape of butter from the receptacle. All of this is accomplished without removing the dasher from the churn.

Fig. I is a side elevation of a churn embodying the features of this invention.

Fig. II is an enlarged vertical section showing the removable strainer at the top of the receptacle.

Fig. III is an enlarged section illustrating a portion of the main closure, and showing the removable strainer on said closure.

Fig. IV is an enlarged top view showing approximately one-half of the main closure and also showing the removable strainer.

To illustrate the invention I have shown a receptacle 1 which may be made of glass, or other suitable material. This receptacle is open at the top and provided with external screw threads adapted to receive corresponding threads in a flange 2 formed integral with a main closure A which normally closes the top of the receptacle. 3 designates a rotary dasher located in the receptacle 1 and secured to the lower end of a vertical shaft 4 which passes through a central opening in the closure A. A frame 5, mounted on and secured to the closure A, is provided with bearings for the vertical shaft 4, and a horizontal operating shaft 6 is also rotatably mounted in this frame. A gear wheel 7, secured to shaft 6 meshes with a pinion 8 secured to the shaft 4. 9 designates an operating crank secured to the shaft 6. It will now be understood that the dasher operating mechanism may be mounted on and secured to the removable closure A. The dasher 3 will rotate in response to a rotary motion of the operating crank 9.

The main closure A is provided with an opening B for the admission and discharge of liquid, and this opening is normally closed or screened by a removable strainer C. Said aperture enables the progress of the churning action or butter formation to be directly observed and also permits of introduction of a thermometer for testing the temperature of the cream.

In the preferred form of the invention, the opening B is in the form of a short spout extending upwardly from a marginal portion of the top of closure A, and provided with side walls 10, a front wall 11 and a rear wall 12, all of said walls being formed by a continuous flange integrally connected to the sheet metal closure. An outwardly extending bead is formed at the top of this flange, as shown most clearly in Figs. II and III.

The removable strainer C is preferably a single piece of sheet metal having downturned side flanges 13 conforming to the outer face of the beads at the upper edge of wall members 10. The strainer is also provided with a similar flange 14 at its rear edge. By referring to Fig. IV, it will be seen that the side walls 10 of the opening in the closure diverge from the rear wall 12 to the front wall 11, and that the same is true of the downturned flanges 13 at the side margins of the removable strainer. When the strainer is mounted on the closure as shown in the drawings, it is interlocked with said closure through the medium of the strainer flanges 13 and 14 which embrace the beads at the upper margins of the walls 10 and 12.

To remove the strainer, it is merely forced toward the center of the main closure A, thereby disengaging the flanges 13 and 14 from the beads with which said flanges are normally interlocked. After the strainer has been released from the beads, it can be readily lifted from the main closure.

To retain the strainer in interlocking engagement with the main closure, a detent 15 is formed at the front margin of the strainer so as to cooperate with the bead at the upper edge of wall 11, as shown by Figs. II and IV. To form this detent 15, a portion of the sheet metal strainer is pressed downwardly, and the strainer itself will yield to permit the detent to pass from the upper edge of wall 11.

In washing the butter, it is not necessary to remove either the dasher, its operating mechanism or the main closure A. After the churning has been completed, the buttermilk is poured through the strainer C which prevents the escape of butter. The strainer is then removed and fresh water is poured through the opening B. The dasher is then operated to wash the butter, and the water is finally poured through the strainer which again serves as means for retaining the butter in the receptacle. All of this can be accomplished very easily and very quickly, without removing any of the elements of the churn, excepting the strainer C. With the strainer removed, the aperture B, opening as it does directly into the churning chamber, affords a direct, unobstructed and uncovered view of the contents of said chamber.

I claim:

1. In a churn, the combination of a churn receptacle open at its top, a removable closure or cover for closing the open top of said receptacle said closure having therethrough an aperture opening directly into the churning chamber, a dasher adapted to be introduced into and removed from said churn receptacle through its open top upon removal of said closure, dasher operating means extending through said closure to said dasher, and a strainer removably and detachably applied to said aperture of the closure.

2. In a churn, the combination of a churn receptacle open at its top and constructed to be approximately invertible, a removable closure or cover for closing the open top of said receptacle said closure having therethrough an aperture opening directly into the churning chamber, a strainer removably and detachably applied to said aperture and adapted when in place for the discharge or pouring of buttermilk therethrough by approximately inverting said churn receptacle said strainer at the same time retaining butter granules within the receptacle and the removal of said strainer leaving said aperture unobstructed and uncovered to afford a direct view of the contents of the churning chamber and to permit ready introduction therethrough of water for washing the butter, a dasher adapted to be introduced into and removed from said churn receptacle through its open top upon removal of said closure, and dasher operating means extending through said closure to the dasher.

3. In a churn, the combination of a churn receptacle open at its top, a removable closure or cover for closing the open top of said receptacle said closure having through its wall an aperture opening directly into the churning chamber, an upstanding flange on said closure surrounding said aperture, a dasher adapted to be introduced into and removed from said churn receptacle through its open top upon removal of said closure, dasher operating means extending through said closure to said dasher, and a strainer removably applied to said aperture by making detachable engagement with said flange.

4. In a churn, the combination of a churn receptacle open at its top, a removable closure or cover for closing the open top of said receptacle said closure having through its wall a spouted aperture opening directly into the churning chamber, a dasher adapted to be introduced into and removed from said churn receptacle through its open top upon removal of said closure, dasher operating means extending through said closure to said dasher, and a strainer removably applied over said spouted opening by making detachable engagement with the spout of said opening.

5. In a churn, the combination of a churn receptacle open at its top, a removable closure or cover for closing the open top of said receptacle said closure having through its wall a spouted aperture opening directly into the churning chamber, an upstanding flange on said closure surrounding said aperture, a dasher adapted to be introduced into and removed from said churn receptacle through its open top upon removal of said closure, dasher operating means extending through said closure to said dasher, and a strainer removably applied to said aperture of the closure and having a flange adapted to make detachable interlocking engagement with said upstanding flange around the aperture.

6. In a churn, the combination of a churn receptacle open at its top, a removable closure or cover for closing the open top of said receptacle said closure having through its wall an aperture opening directly into the churning chamber, a dasher adapted to be introduced into and removed from said churn receptacle through its open top upon removal of said closure, dasher operating means extending through said closure to said dasher, a strainer removably and detachably applied over said aperture of the closure, and interlocking means on said closure and strainer for securing the strainer in position over the aperture said interlocking means being adapted to be disengaged by relative movement of strainer and closure to permit detachment and removal of the strainer.

7. In a churn, the combination of a churn receptacle open at its top, a removable closure or cover for closing the open top of said receptacle said closure having through its wall an aperture opening directly into the churning chamber, a dasher adapted to be introduced into and removed from said churn receptacle through its open top upon removal of said closure, dasher operating means extending through said closure to said dasher, a strainer removably and detachably applied over said aperture of the closure, interlocking means on said closure and strainer for securing the strainer in position over the aperture said interlocking means being adapted to be disengaged by relative movement of said strainer and closure to permit detachment and removal of the strainer, and a detent adapted to lock said parts against such relative movement and adapted to be manually released to permit such movement.

8. In a churn, the combination of a churn receptacle open at its top, a removable closure or cover for closing the open top of said receptacle said closure having through its wall an aperture opening directly into the churning chamber, an upstanding flange on said closure surrounding said aperture, a dasher adapted to be introduced into and removed from said churn receptacle through its open top upon removal of said closure, dasher operating means extending through said closure to said dasher, and a strainer removably and detachably applied to said aperture of the closure and having a flange along its edge adapted to make interlocking detachable engagement with a bead along the edge of said upstanding flange around the aperture.

9. In a churn, the combination of a churn receptacle open at its top, a removable main closure or cover for closing the open top of said receptacle said closure having through its wall an aperture opening directly into the churning chamber, a dasher adapted to be introduced into and removed from said churn receptacle through its open top upon removal of said main closure, dasher operating means extending through said main closure to said dasher, a strainer forming a closure for said aperture of the main closure said strainer being removably and detachably interlocked with said main closure, and a detent retaining said strainer in interlocking engagement with said main closure and adapted to be manually released for removal and disengagement of the strainer from said closure.

10. In a churn, the combination of a churn receptacle open at its top, a removable main closure or cover for closing the open top of said receptacle said closure having through its wall an aperture opening directly into the churning chamber and said aperture having oppositely disposed diverging side walls, a dasher adapted to be introduced into and removed from said churn receptacle through its open top upon removal of said main closure, dasher operating means extending through said main closure to said dasher, and a removable detachable strainer forming a closure for said aperture of the main closure said strainer having diverging marginal portions adapted to make interlocking engagement with the diverging side walls of said aperture.

11. In a churn, the combination of a churn receptacle open at its top, a removable main closure or cover for closing the open top of said receptacle said closure having through its wall an aperture opening directly into the churning chamber and said aperture having oppositely disposed diverging side walls, a dasher adapted to be introduced into and removed from said churn receptacle through its open top upon removal of said main closure, dasher operating means extending through said main closure to said dasher, and a removable detachable strainer forming a closure for said aperture of the main closure said strainer having diverging marginal portions slidable on and adapted thereby to be moved into and out of interlocking engagement with the diverging side walls of said aperture.

12. In a churn, the combination of a churn receptacle open at its top, a removable main closure or cover for closing said open top of said receptacle said closure having through its wall an aperture opening directly into the churning chamber and said aperture having oppositely disposed side walls diverging from its rear wall to its front wall with an outwardly projecting bead along the upper edge of said side walls, a dasher adapted to be introduced into and removed from said churn receptacle through its open top upon removal of said closure, dasher operating means extending through said closure to said dasher, a removable detachable strainer forming a closure for said aperture in the main closure said strainer having down turned diverging flanges conforming to the bead on the diverging side walls of the aperture and adapted to make detachable interlocking engagement therewith, and a detent on the strainer adapted to cooperate with the front wall of the aperture to hold the strainer in place and to be released to permit removal and detachment of the strainer.

In testimony that I claim the foregoing I hereunto affix my signature.

NATHAN P. DAZEY.